April 4, 1961  L. E. STROMAN  2,977,741
MECHANICAL COTTON DEFOLIATOR AND TOPPER
Filed Nov. 10, 1959  3 Sheets-Sheet 2

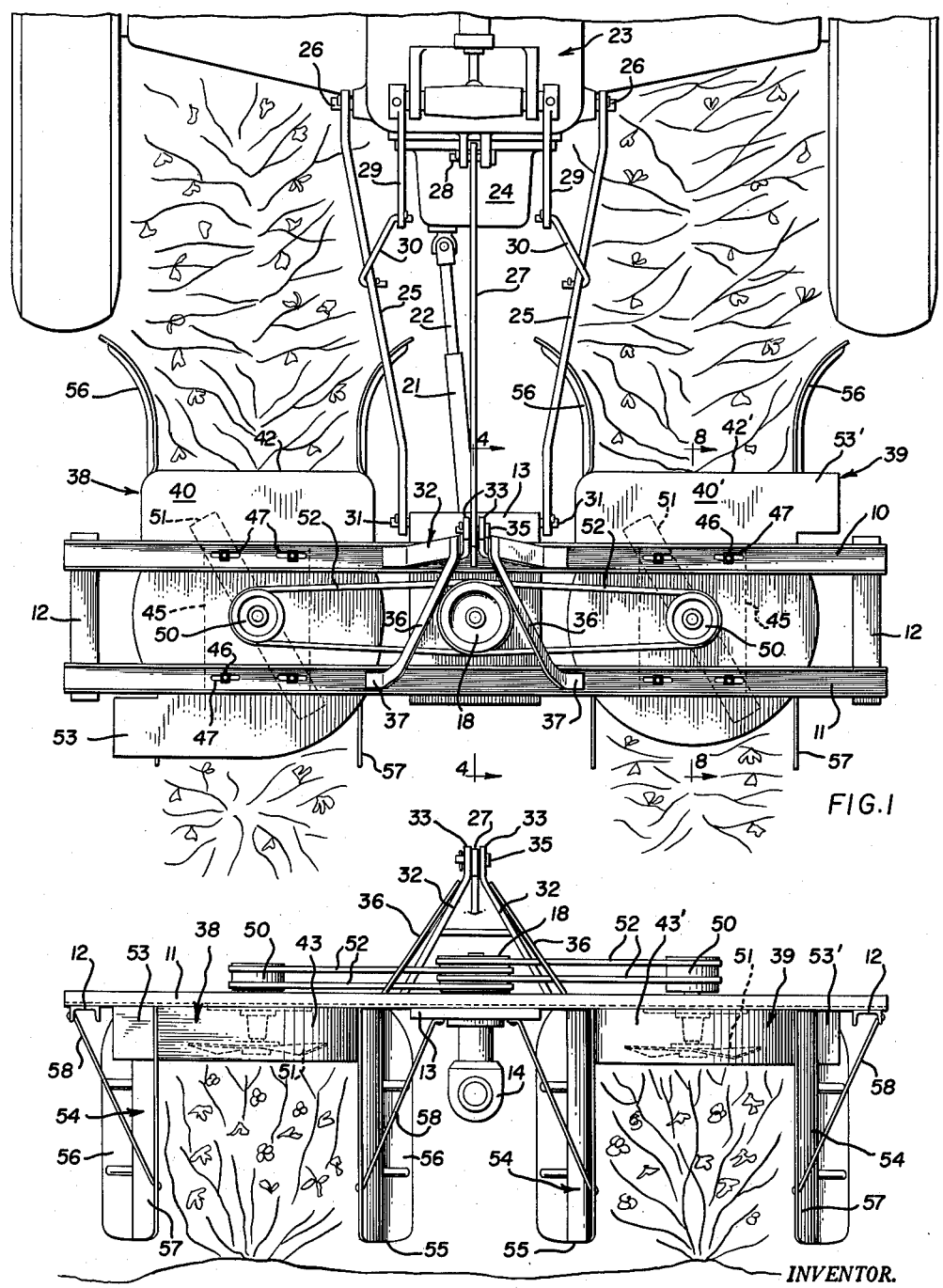

INVENTOR.
L.E. STROMAN
BY
ATTORNEY

INVENTOR.
L. E. STROMAN

United States Patent Office 2,977,741
Patented Apr. 4, 1961

2,977,741

MECHANICAL COTTON DEFOLIATOR AND TOPPER

Lawrence E. Stroman, Cameron, S.C.

Filed Nov. 10, 1959, Ser. No. 852,055

4 Claims. (Cl. 56—25.4)

This invention relates to apparatus for defoliating and topping cotton plants and the like.

Cotton topping machines in the nature of mowers, which merely sever the tops of cotton plants, are known in the art. Chemical defoliation of cotton plants is also widely practiced to promote growth and proper development of the bolls and blooms on the lower portions of the plants by admitting more air and sunlight thereto. Neither practice of merely topping the cotton plants nor chemically defoliating them is entirely satisfactory for producing the desired results. When the plants are topped by means of conventional cotton topping apparatus, the upper portions of the plants are merely severed with the foliage thereon, and the severed stems and foliage tends to drop back onto the cotton plants and to become entangled therein, block the sunlight and generally defeat the very purpose of the topping operation. Chemical defoliation likewise is not entirely satisfactory and is also very expensive. When chemical defoliation is practiced without topping, the chemical defoliants may be ineffective against the immature foliage near the tops of the plants, and much of the chemical defoliant may be wasted without producing the desired results. Chemical defoliating at best is a rather haphazard operation, and difficult to control. Also, the combined efforts of conventionally topping the cotton plants and chemical defoliation have not produced the most desirable results, because the above-mentioned deficiencies of the separate practices are still present.

With my apparatus, according to the present invention, I can achieve results which are superior to the combined operations of conventionally topping the plants and chemically defoliating them. Additionally, if it is still desirable to employ chemical defoliation, after my apparatus has acted upon the cotton plants, the chemcal defoliation will be aided and a great saving of the chemical defoliant will be effected.

With my apparatus, the cotton plants are not merely topped in the sense of severing the upper portions of the plants and allowing such portions to fall back among the stems and foliage, but rather, the plants are topped or cut to the desired height and the cuttings are ground up or mulched into a very fine residue, which residue is broadcast by the apparatus over a wide area, where it does not interfere with or block the growth of the cotton plants, but serves the useful purpose of rendering the ground more fertile. Additionally, my apparatus employs novel plant gathering or lifting elements, which assure that the cotton plants are substantially upright in the row when they are being acted upon to top or defoliate the same. My apparatus is also readily adjustable for cutting the cotton plants to the desired height in the rows, and the apparatus is adapted for connection with the well known three point hitch mechanism of a conventional farm tractor. The apparatus is simplified in construction, sturdy and durable, relatively economical to manufacture and highly efficient for producing the desired results above-enumerated, and in overcoming the mentioned deficiencies of the prior are devices along similar lines.

The general objectives of the invention having been stated, it is believed that other objects and advantages of the invention will become apparent during the course of the following detailed description.

In the accompanying drawings forming a part of this application and in which like numerals are employed to designate like parts throughout the same, Figure 1 is a plan view of a cotton topping and defoliating apparatus according to the invention.

Figure 2 is a rear elevation of the same.

Figure 3:
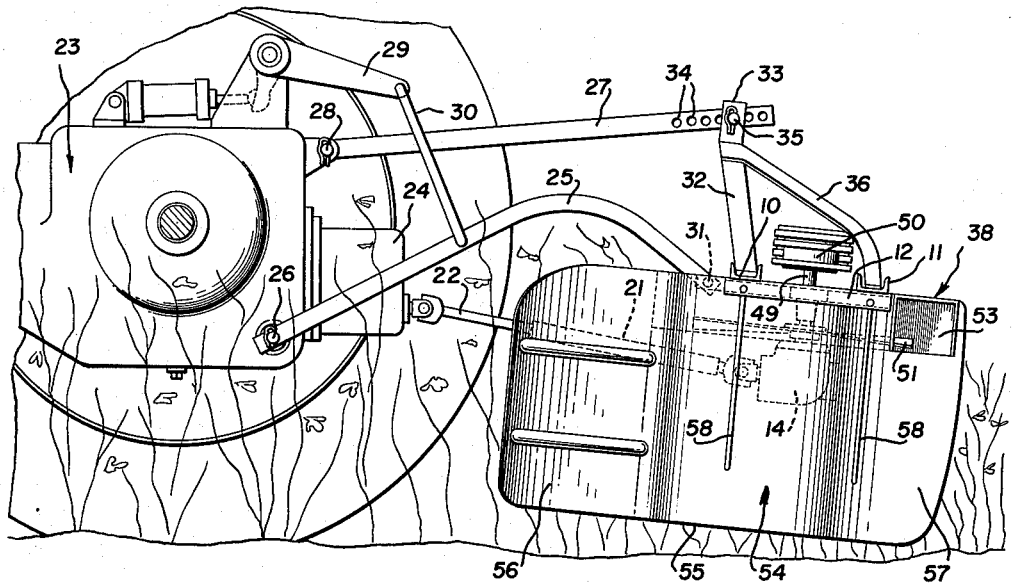
Figure 3 is a side elevation of the apparatus.

In the drawings, wherein for the purpose of illustration are shown preferred embodiments of the invention, attention is directed first to Figures 1 through 5 and 8, wherein there is illustrated an embodiment of the apparatus adapted to act upon two adjacent rows of cotton plants simultaneously.

With reference to these figures of the drawings, the apparatus proper comprises a supporting frame, including a pair of elongated spaced transversely extending rigid frame bars 10 and 11, of a length to completely span two adjacent rows of cotton plants, as shown in Figure 1 and 2. The frame bars 10 and 11 are rigidly interconnected at their ends by short longitudinally extending frame bars 12, welded or otherwise rigidly secured thereto.

Figure 4:
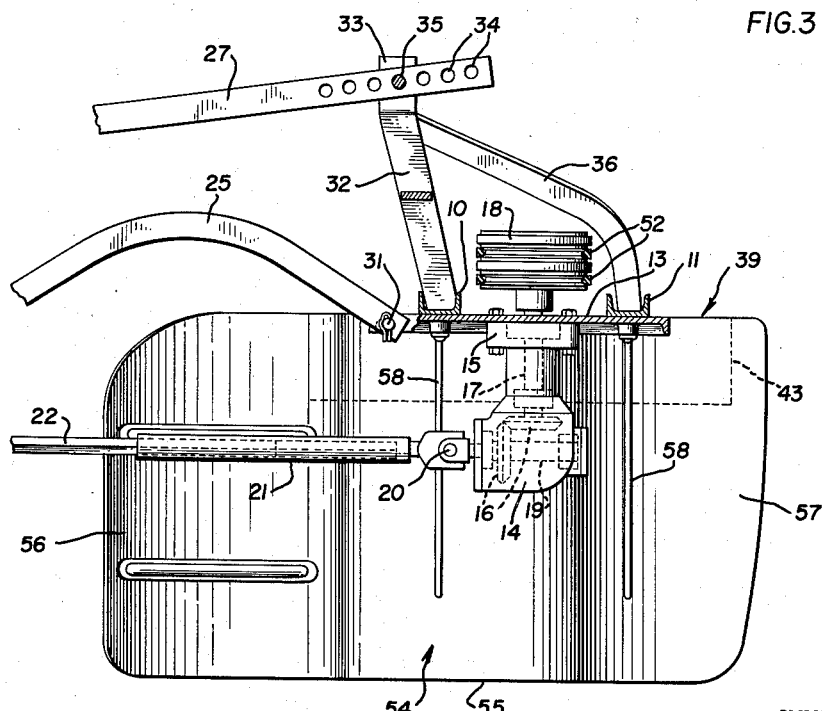
Figure 4 is a an enlarged vertical section taken on line 4—4 of Figure 1, and with the apparatus adjusted to a horizontal position to simplify illustration.

At the longitudinal centers of the frame bars 10 and 11, a rigid rectangular plate or casting 13 is fixedly secured to the bottoms of the bars 10 and 11 and spans the same transversely, as shown. This plate 13 forms a rigid mount for an underlying gear box 14, having an upper flange 15 bolted to the plate 13, as shown in Figure 4. The gear box 14 houses a pair of right angle bevel gears 16, one of which is carried by a vertical shaft 17, having an upper extension operating through an opening in the horizontal plate 13, and carrying at its top for rotation therewith a multiple grooved pulley 18. The pulley 18 is thus positioned above and near the plate 13.

The second bevel gear 16, Figure 4, is rigidly mounted upon a horizontal rotatable shaft 19, journaled for rotation upon the gear box 14, and having its forward end connected through a universal joint 20 with a forwardly projecting hollow drive shaft 21, adapted to receive the power take-off shaft 22 of a farm tractor 23.

With continued reference to the drawings, the tractor 23 has the usual power take-off gear box 24 for imparting rotation to the mentioned power take-off shaft 22. The tractor 23 is also equipped with the usual three point implement hitch, including a pair of spaced apart hitch arms 25, having their forward ends pivoted to the rear axle housing of the tractor at 26. The three point hitch further embodies a central longitudinal arm 27 having its forward end pivoted to the tractor at 28. The tractor is further equipped with a pair of spaced apart vertically swingable hydraulically operated implement lift cranks 29, connected with the hitch arms 25 through the medium of lift links 30.

The rear ends of the hitch arms 25 are pivotally secured at 31 to the opposite sides of plate 13, adjacent the forward end of the latter. An upstanding and somewhat forwardly inclined yoke including diverging arms 32 is rigidly mounted upon the forwardmost frame bar 10, above the plate 13, and this yoke has a pair of closely spaced apertured top extensions 33, pivotally receiving therebetween the rear extremity of hitch arm 27. The rearmost portion of the arm 27 has a plurality of spaced adjusting openings 34 formed therethrough, any one of which may register with the openings of the yoke extensions 33, for effecting a pivotal connection between the arm 27 and yoke, as at 35. The upstanding yoke 32 is preferably strengthened by a pair of rearwardly inclined and diverging braces 36, having their lower ends rigidly secured to the frame bar 11 at 37.

It may now be seen that the apparatus is bodily supported behind the tractor 23 by means of the well known three point hitch, and the apparatus is raised and lowered relative to the ground by the conventional hydraulic lift means of the tractor. Power is applied to the apparatus from the power take-off shaft 22 of the tractor in the manner described and shown clearly in Figure 4.

The apparatus proper further embodies a pair of row treating units 38 and 39, as shown. Each such unit embodies a generally horizontal downwardly open relatively shallow sheet metal housing of the configuration shown in the plan views, Figures 1 and 5. Each housing has a top wall 40 and 40' and a depending marginal side wall or skirt. The side wall is substantially continuous about the margin of the downwardly open housing. The side wall includes at the front of each unit 38 and 39 a straight transverse wall portion 42 and 42', Figure 5, a circularly curved central wall portion 43 and 43', and relatively short connecting longitudinal wall portions 44 and 44'.

Directly beneath the top wall 40 and 40' of each housing, there is provided an underlying rigid reinforcing plate 45, covering a portion of the underside of the sheet metal top wall 40 and 40'. Each such plate 45 and the overlying sheet metal top wall 40 and 40' is bolted to the frame bars 10 and 11 as at 46, and the bars 10 and 11 are preferably slotted at 47, Figure 1, to provide some lateral adjustability for the units 38 and 39.

Figure 8:
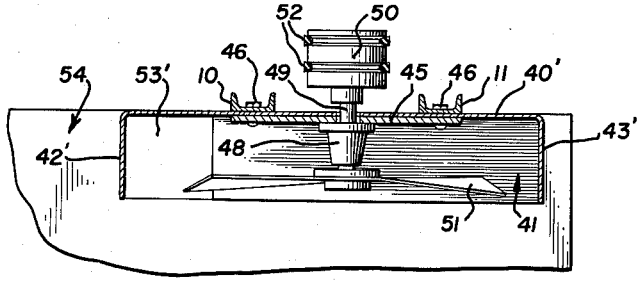
Figure 8 is an enlarged fragmentary vertical section taken on line 8—8 of Figure 1.

Rigid with the plate 45 of each unit 38 and 39 is a suitable bearing means 48, Figure 8, having journaled therein for rotation a short vertical shaft 49, carrying a multiple grooved pulley 50 at its upper end and rigidly secured thereto. The lower end of the shaft 49, below the bearing 48, has rigidly secured thereto for rotation therewith a rotary cutter blade 51, which blade is disposed close to and above the bottom open end of the adjacent housing. Each blade 51 rotates within the circularly curved portion of the sheet metal housing, Figure 5, defined by the circular marginal wall portion 43. The ends of the blade 51 preferably pass close to the circularly curved wall portion 43 as shown.

As most clearly shown in Figures 1 and 2, the multiple grooved pulleys 18 and 50 of the apparatus project above the elevation of frame bars 10 and 11 and are spaced midway therebetween and in alignment transversely of the apparatus. The driving pulley 18 is operatively connected with the driven pulleys 50 through the medium of conventional multiple belt means 52. Thus, simultaneous rotation in the same direction is imparted to the rotary cutter blades 51, upon rotation of the interconnected shafts 21 and 22, driven from the power take-off gear box 24 of the tractor.

Figure 5:
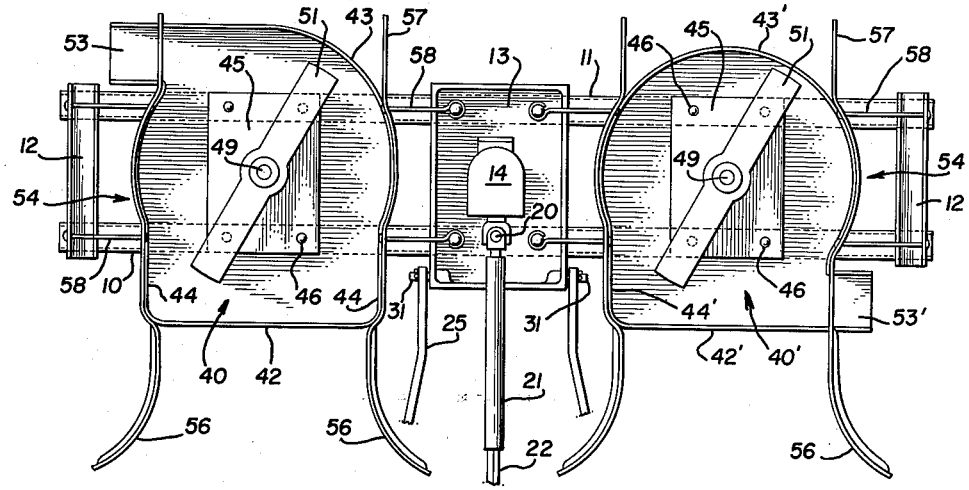
Figure 5 is a bottom plan view of the apparatus.

As shown in the drawings, particularly Figures 1 and 5, the sheet metal housing of the unit 38 has a rear laterally outwardly directed nozzle extension 53, for the discharge or broadcasting of the ground or mulched cotton plant topping. Similarly, the housing of the unit 39 has a forward and laterally outwardly directed nozzle extension 53' for the same purpose. The action of the high speed rotary cutter blades 51 inside of the downwardly open sheet metal housings of the units 38 and 39 thoroughly grinds up or mulches the cotton plant toppings and broadcasts the same outwardly laterally through the nozzles 53 and 53' during the operation of the apparatus. This is an important feature of the invention, and a feature which has not heretofore been provided on cotton topping machines. Without this mulching feature, the cut toppings with their stems and foliage tend to fall back onto the trimmed cotton plants, and defeat the purpose of topping the plants by blocking the sunlight and impeding the action of chemical defoliants when such are used. With my apparatus, the finely divided cotton plant toppings are scattered outwardly of the plant rows over a wide area, to serve the useful purpose of fertilizing the soil, and the mulched residue does not and cannot impede the growth of the topped cotton plants or defeat the purpose of topping them or interfere with chemical defoliation.

A further and extremely important feature of the invention resides in the provision on each of the units 38 and 39 of a pair of vertically wide spaced longitudinally extending cotton plant gathering and lifting vanes 54, formed of sheet metal. The vanes 54 of each unit are secured by spot welding or the like to the opposite sides of the shallow sheet metal housings which enclose the cutter blades 51, and the vanes 54 extend for substantial distances below the bottoms of the housings as clearly shown in the drawings. As indicated in Figure 3, the lower longitudinal edges 55 of the vanes 54 are adapted to pass close to the ground level during the operation of the apparatus, while the housings and cutter blades 51 are disposed a substantial distance above the ground. As viewed from the side, Figures 3 and 4, the cotton plant deflectors or vanes 54 are generally rectangular in configuration and long enough and vertically wide enough to span or encompass several cotton plants in a particular row of plants. The vanes 54 have leading portions 56 which diverge forwardly of the housing front walls 42 and 42', Figure 5. The vane portions 56 are preferably curved as shown. The vane portions 56 extend a substantial distance forwardly of the housing walls 42 and 42' and the forward extremities of the vane portions 56 extend laterally outwardly of the side walls of the housings as shown in Figure 5. The vanes 54 also include rear or trailing preferably parallel extensions 57, as indicated. The vanes 54 are circularly curved intermediate their ends to conform to the shapes of the housing side walls 43 and 43' and 44 and 44', to which they are welded. The vanes 54 thus extend forwardly and rearwardly of the cutter blade housings, as shown in Figure 5. As shown in Figure 3, the vanes 54 of the units 38 and 39 are apertured at their tops to receive the nozzle extensions 53 and 53', so that the vanes will not block the discharge of the mulched plant material through the nozzles. The vanes 54 depend from the sheet metal housings to which they are secured and are substantially vertically disposed. As best shown in Figure 2, the vanes 54 of the units 38 and 39 are strengthened and rendered more rigid by diagonal braces 58, which interconnect the vanes with the frame bars 12 and the central plate 13.

The operation of the apparatus shown in Figures 1 to 5 and 8 is as follows:

The apparatus is supported at the rear of the tractor 23 in the manner already described, and preferably in a slightly forward and upwardly inclined position with respect to the horizontal. The desired inclination from the horizontal for the apparatus may be obtained by utilizing the desired opening 34 of the hitch arm 27.

The tractor 23 travels astride two rows of cotton plants as shown in Figure 1, and the units 38 and 39 are adjusted to travel over or along the two rows of plants. Depending somewhat upon the size or height of the cotton plants to be topped, the apparatus is adjusted vertically by means of the tractor implement lift 29 to position the cutter blades 51 at the desired elevation near and below the tops of the plants. The lower edges 55 of the plant gathering and lifting vanes 54 are generally quite close to the ground as shown in Figure 3, although this condition may vary somewhat depending upon the size and character of the plants.

When the apparatus is thus properly oriented with respect to the rows of cotton plants, the tractor is started and travels lengthwise of the rows and the power take-off shaft 22 of the tractor imparts rapid rotation to the cutter blades 51 within the sheet metal housings, through the medium of the gearing and the belt and pulley drive means shown and described.

Prior to topping and/or defoliating, the cotton plants are quite large and are top heavy with foliage and due to the action of the wind and rain are ferquently somewhat toppled over and intertwined with the plants of the next adjacent rows, so that the rows have lost their character. As the apparatus progresses along the rows of cotton plants, the vanes 54, particularly the leading diverging portions 56 thereof, enter into engagement with the cotton plants and straighten them up or lift them into proper alignment in the rows and gather their foliage upwardly and direct the tops of the plants beneath the downwardly open sheet metal housings for the cutter blades 51. This causes the cutter blades 51 to effectively cut or top the plants with relative uniformity and without missing any of the plants due to their being toppled over or out of alignment in the rows. This missing or skipping of cotton plants during a conventional topping operation frequently occurs because the conventional machines are not provided with my lifting and gathering vanes 54.

As the plants are thus topped, the cuttings or toppings are whirled about inside of the housings 40 by the blades 51 and thoroughly chopped up or mulched to an extremely fine state. This mulched residue is not allowed to fall back onto the plants of the particular rows being treated, but instead is broadcast outwardly over a wide area through the lateral nozzles 53 and 53' as previously explained. Thus, the topped foliage cannot fall back upon the plants to block the sunlight and otherwise defeat the purpose of topping and/or chemical defoliation, when the latter is employed subsequent to topping. The prior art cotton topping machines lack entirely this important feature of grinding or mulching the toppings and then broadcasting them over a wide area to serve as fertilizer for the soil, without interfering with or impeding the growth of the plants.

As the apparatus continues to travel down the rows of cotton plants, its action on the rows is continuous and the plants are gathered together and lifted into proper engagement with the rotary cutters 51, which cutters continue to top the plants and to mulch the cuttings into an extremely fine residue, as stated.

It may now be seen that I have provided an apparatus which constitutes a distinct improvement over prior art devices of this general character. My apparatus complete overcomes the aforementioned deficiencies of the prior art and operates with a high degree of efficiency for treating cotton plants in the described manner.

Figure 6:
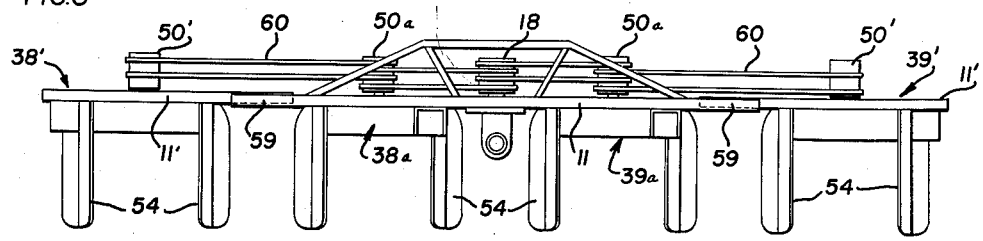
Figure 6 is a rear elevational view, partly diagrammatic, of a modified form of apparatus including two additional row units.
Figure 7:
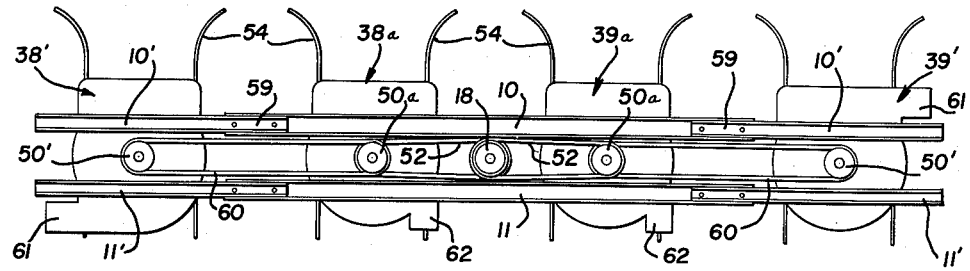
Figure 7 is a plan view partly diagrammatic of the apparatus shown in Figure 6.

With reference to Figures 6 and 7 of the drawings, there is shown partly diagrammatically an apparatus which is identical to the apparatus in Figures 1–5 and 8, except for the fact that two additional row units 38' and 39' have been provided laterally outwardly of the two central units 38a and 39a. This may be readily accomplished by merely providing frame bar extensions 10' and 11' on the outer units 38' and 39', and splicing these bars to the central frame bars 10 and 11, as at 59.

The pulleys 50' of the outermost units 38' and 39' are now driven by belt means 60 from the inboard pair of pulleys 50a. In Figure 7, in order to distribute the mulched plant residue over the widest possible area, the nozzles 61 of the outermost units 38' and 39' are directed outwardly laterally from the rear and front respectively of the outermost units, while the nozzles 62 of the central units 38a and 39a are directed rearwardly, as shown in Figure 7.

All other parts of the apparatus shown in Figures 6 and 7 are identical in construction and operation to the corresponding parts shown and described in connection with the prior form of the invention, and the only difference between the two forms of the invention is that the form shown in Figures 6 and 7 may operate on four rows of cotton plants simultaneously instead of two rows with the first form of the invention.

It is to be understood that the forms of the invention herewith shown and described are to be taken as preferred examples of the same, and that various changes in the shape, size and arrangement of parts may be resorted to, without departing from the spirit of the invention or the scope of the subjoined claims.

Having thus described my invention, I claim:

1. Cotton plant treating apparatus comprising a pair of spaced elongated substantially parallel frame bars adapted to span a plurality of rows of cotton plants transversely of the rows, yoke means secured to the frame bars near their longitudinal centers and extending above the frame bars for attachment to the three point hitch and lift means of a farm tractor, a mounting plate secured to the bottoms of the frame bars near their longitudinal centers, a gear box dependingly secured to said mounting plate, gearing within the gear box and including a forwardly projecting shaft to be coupled with and driven by the power take-off shaft of said tractor, a plurality of laterally spaced downwardly open vertically shallow housings secured to the bottoms of the frame bars adjacent the rows of cotton plants and spaced outwardly of said mounting plate, substantially horizontal rotary cutter blades disposed within said housings and having vertical shaft means extending above the tops of the housings, driving connecting means between said shaft means and gearing to rotate the shaft means of the housings in unison, and a pair of longitudinally extending generally parallel laterally spaced vertically wide cotton plant gathering vanes depending secured to the opposite longitudinal sides of each housing and extending a substantial distance below the bottom of the housing and forwardly of the housing and diverging forwardly of the housing.

2. Cotton plant treating apparatus comprising a transversely elongated horizontal frame adapted to span at least a pair of adjacent rows of cotton plants transversely, upstanding yoke means secured to said frame near the longitudinal center thereof and adapted for attachment to the three point hitch and lift means of a farm tractor, a gear box dependingly secured to said frame near the longitudinal center thereof and below the yoke means, gearing within said gear box including a forwardly projecting generally horizontal shaft to be coupled with the power take-off shaft of said tractor, at least a pair of laterally spaced downwardly open vertically shallow housings secured to the bottom of the frame above the rows of cotton plants and spaced upon opposite sides of said gear box, substantially horizontal rotary cutter blades disposed within said shallow housings and having vertical shafts projecting above the tops of the housings and above said frame, horizontally moving flexible gearing interconnecting said shafts and first-named gearing above said frame to rotate said shafts and cutter blades in unison, and a pair of longitudinally extending generally parallel laterally spaced vertically wide cotton plant gathering vanes formed of stiff sheet material dependingly secured to the opposite longitudinal sides of each shallow housing and extending a substantial distance below the open bottom of each housing and forwardly and rearwardly of each housing, said vanes of each pair diverging laterally in advance of the associated housing.

3. Cotton plant treating apparatus comprising a transversely elongated horizontal frame adapted to span at least a pair of rows of cotton plants transversely, rigid supporting means atop said frame near the longitudinal center of the frame for attachment to the hitch and lift means of a farm tractor, gearing dependingly secured to said frame near the longitudinal center thereof including a forwardly projecting generally horizontal shaft to be coupled with the power take-off shaft of said tractor, at least a pair of laterally spaced downwardly open vertically shallow housings secured to the bottom of the frame adjacent the rows of cotton plants and spaced upon opposite sides of said gearing, substantially horizontal rotary cutter blades disposed within said housings and having vertical shafts projecting above the tops of the housings and said frame, transversely extending horizontal belt drive means interconnecting said shafts and gearing above said frame for rotating said shafts and cutter blades in unison, and a pair of laterally spaced generally parallel longitudinal cotton plant gathering vanes formed of stiff sheet material dependingly secured to opposite sides of each shallow housing and forwardly and rearwardly of the housing and diverging forwardly of the housing, said vanes extending vertically below said housings a distance equal to at least three times the vertical height of each shallow housing.

4. Cotton plant treating apparatus comprising a substantially horizontal transversely elongated rigid frame adapted to span at least a pair of rows of cotton plants transversely, carrying means secured to the top of said frame near the longitudinal center thereof adapted for attachment to the hitch and lift means of a farm tractor, whereby said frame may be carried along the rows of plants at an elevation near the tops of mature standing cotton plants, at least a pair of laterally spaced horizontal rotary cutter blades disposed near the bottom side of said frame adjacent to said rows and having vertical shafts journaled upon said frame and projecting above the top of the frame and disposed upon opposite sides of the longitudinal center of the frame, transversely extending belt gearing driving said shafts and cutter blades in unison above said frame and adapted for connection with the power take-off shaft of said tractor, and a pair of longitudinally extending generally parallel laterally spaced vertically wide cotton plant gathering vanes formed of stiff sheet material dependingly secured to said frame near opposite sides of each cutter blade, said vanes extending forwardly and rearwardly of each cutter blade and forwardly and rearwardly of said frame and having lower substantially horizontal edges in close proximity to the ground when the cutter blades are near the tops of the mature cotton plants, said vanes diverging forwardly of the cutter blades and frame and defining between them an unobstructed longitudinal passage for cotton plants in the rows beneath said frame and cutter blades.

References Cited in the file of this patent

UNITED STATES PATENTS

| | | |
|---|---|---|
| 2,505,952 | Fergason | May 2, 1950 |
| 2,719,396 | Morris et al. | Oct. 4, 1955 |
| 2,835,095 | Self | May 20, 1958 |